United States Patent
Botheroyd (10) Patent No.: US 9,897,759 B2
(45) Date of Patent: Feb. 20, 2018

(54) APPARATUS FOR COMBINING OPTICAL RADIATION

(71) Applicant: SPI Lasers UK Limited, Southampton, Hampshire (GB)

(72) Inventor: Iain Botheroyd, Rugby (GB)

(73) Assignee: SPI Lasers UK Limited, Hampshire (GB)

(*) Notice: Subject to any disclaimer, the term of this patent is extended or adjusted under 35 U.S.C. 154(b) by 0 days.

(21) Appl. No.: 15/212,901

(22) Filed: Jul. 18, 2016

(65) Prior Publication Data

US 2017/0017036 A1    Jan. 19, 2017

(30) Foreign Application Priority Data

Jul. 17, 2015    (GB) .................................... 1512610.5

(51) Int. Cl.

| G02B 6/26 | (2006.01) |
|---|---|
| G02B 6/14 | (2006.01) |
| H01S 3/094 | (2006.01) |
| G02B 6/28 | (2006.01) |
| G02B 6/255 | (2006.01) |

(52) U.S. Cl.
CPC ............ *G02B 6/2856* (2013.01); *G02B 6/14* (2013.01); *G02B 6/2552* (2013.01); *G02B 6/2835* (2013.01); *H01S 3/094007* (2013.01); *H01S 3/094053* (2013.01); *H01S 3/094069* (2013.01)

(58) Field of Classification Search
None
See application file for complete search history.

(56) References Cited

U.S. PATENT DOCUMENTS

| 8,472,765 | B2 | 6/2013 | Holland et al. | |
|---|---|---|---|---|
| 2005/0105854 | A1 | 5/2005 | Dong et al. | |
| 2007/0206909 | A1* | 9/2007 | Wetter ................. | G02B 6/0218 385/92 |
| 2009/0202204 | A1* | 8/2009 | Nielsen ................ | G02B 6/2551 385/43 |
| 2010/0124393 | A1* | 5/2010 | Li .......................... | G02B 6/241 385/29 |
| 2011/0123155 | A1* | 5/2011 | Kumkar ............... | G02B 6/2856 385/43 |
| 2014/0241385 | A1* | 8/2014 | Fomin .................. | G02B 6/4296 372/6 |
| 2014/0241663 | A1 | 8/2014 | Fomin et al. | |
| 2015/0003498 | A1* | 1/2015 | Holland ............... | G02B 6/2856 374/161 |
| 2015/0049983 | A1* | 2/2015 | Fisher ................... | B32B 37/12 385/29 |

FOREIGN PATENT DOCUMENTS

| WO | WO-2007107163 A1 | 9/2007 |
|---|---|---|
| WO | WO-2014129023 A1 | 8/2014 |

\* cited by examiner

*Primary Examiner* — Michelle R Connelly
(74) *Attorney, Agent, or Firm* — Gazdzinski & Associates, PC (57) ABSTRACT

An apparatus for combining optical radiation, wherein the apparatus comprises a bundle of input optical fibers formed of glass, a taper, and an output optical fiber, wherein the taper is fused to the output optical fiber; and the apparatus comprises at least one cladding mode stripper to strip out higher order modes that would otherwise degrade a polymer coating on at least one of the input optical fibers and the output optical fiber.

22 Claims, 7 Drawing Sheets

APPARATUS FOR COMBINING OPTICAL RADIATION

This application claims priority under 35 U.S.C. § 119 to United Kingdom Patent Application No. 1512610.5 filed on Jul. 17, 2015.

FIELD OF INVENTION

This invention relates to apparatus for combining optical radiation. The invention has particular relevance for pumping high power optical lasers and amplifiers.

BACKGROUND TO THE INVENTION

High power fibre lasers require multi-mode pump combiners to couple pump radiation from multiple high power fibre-coupled diodes into the cladding of rare-earth-doped gain fibres, either directly, or via an intermediate fibre. These fibres are often coated with a polymer coating which acts as a cladding for the pump radiation to be guided against. However, this polymer coating is a source of unreliability as it can overheat if subjected to pump radiation that exceeds the numerical aperture of the fibre.

It would be advantageous if there were a high power combiner in which light with a high numerical aperture could be removed from light with the desired lower numerical aperture such that subsequent absorption by the high numerical aperture polymer coating of the intermediary or gain fibre is minimized. It would be advantageous if this could be achieved without the use of polymers, liquids, gels, or other materials that can thermally degrade or that have a refractive index that is more sensitive to temperature than silica. Such a solution would enable additional power-scaling of fibre lasers by permitting higher pump powers to be used and allowing for gain fibres with smaller cladding areas cladding sizes. This is advantageous because it would enable the non-linear power threshold of the fibre laser to be increased, permitting either shorter lengths of gain fibres at the same power levels, or higher output power levels if the same length of gain fibre is used.

U.S. Patent Application Publication No. US2015-0062693 describes a high-power liquid-cooled pump and signal combiner that uses a fluid within a cooling chamber. The fluid has a refractive index selected to control the interaction and propagation of the light in the fluid. This method of removing unwanted light is complex and expensive to implement. Any method of introducing a liquid into a compact and sensitive component will require careful engineering. Further, the control of the refractive index of the liquid will be critical in determining the performance of the signal combiner. The refractive index (and so the composition) of the liquid will need to vary depending on the specific design of the combiner and the characteristics of the inputs to the combiner. There are also concerns about the long term reliability of components having bare fibre with exposed glass surfaces in contract with the fluid.

U.S. Patent Application Publication No. US2014-0241663 describes an ultra-high power fiber laser system including a multimode combiner which is configured with a plurality of low mode fibers bundled together and tapering toward its downstream end. The system further includes a clad mode absorber extending along the tapered downstream end of the combiner and extending over a portion of the combiner's output fiber. The absorber is configured with sequentially located zones which are provided with respective refractive indices. In a forward propagating direction of light signal, the upstream zone includes polymeric material with the refractive index higher than that of the cladding of the combiner end fiber. This zone is configured to remove the back reflected core guided light bled into the cladding of the combiner through a splice between combiner end and output fibers. The intermediate zone includes polymeric material configured with a refractive index lower than that of the cladding of the combiner output fiber so it can prevent clad guided signal light from decoupling the cladding under the material. The downstream zone is configured with polymeric material having a refractive index lower than that of the cladding of the combiner output fiber. The polymeric material of the downstream zone is impregnated with a plurality of light diffusers scattering high numerical aperture rays of the clad-guided signal light. The multimode combiner, however, is based on polymeric materials which have associated reliability concerns owing to poor thermal properties.

An aim of the present invention is to provide an apparatus for combining optical radiation which reduces the above aforementioned problems.

SUMMARY

In a first aspect, according to a non-limiting embodiment of the present invention, there is provided apparatus for combining optical radiation, which apparatus comprises a plurality of inputs, a taper formed from glass, and an output optical fibre, wherein: the taper comprises a waveguide having a glass outer cladding, which waveguide is defined by a numerical aperture $NA_T$; the taper has a first end having a first diameter, and a second end having a second diameter; the first diameter is greater than the second diameter; the plurality of inputs are coupled to the first end; the second end is coupled to the output optical fibre; the output optical fibre is defined by a fibre diameter $D_F$; the output optical fibre comprises a polymer coating; the output optical fibre has a numerical aperture $NA_F$; the apparatus being characterized in that: the taper comprises a cladding mode stripper located at a diameter $D_{CMS}$ equal to a fraction, the numerator of which is the product of the fibre diameter $D_F$, the numerical aperture $NA_F$, and a factor $\beta$, and the denominator of which is the numerical aperture $NA_T$, such that $D_{CMS} = D_F \cdot NA_F \cdot \beta / NA_T$; the factor $\beta$ is less than 1.0; thereby ensuring that higher angle rays propagating along the taper towards the output optical fibre are attenuated thus reducing or eliminating damage to the polymer coating.

In a further aspect, the invention provides

Apparatus for combining optical radiation, which apparatus comprises a plurality of inputs, a taper formed from glass, and an output fibre, wherein the taper comprises a cladding mode stripper adapted to strip out higher order modes that would otherwise degrade a polymer coating on the output fibre. The cladding mode stripper may be formed by modifying part of a cladding layer of the taper, which may be a glass cladding layer.

An advantage of embodiments of the invention is that higher angle rays are attenuated in the taper, and thus do not reach the polymer cladding of the output optical fibre. This is important for optical fibre lasers and amplifiers that have powers greater than around 100 W because such coatings are often made using polymers. These polymers can degrade if optical power leaks from the glass fibre into the coating. Such leakage can be reduced or completely eliminated by ensuring that there is a sufficient factor $\beta$. Importantly, by tailoring the position of the cladding mode stripper along the taper, it is possible to fine tune the factor β. The factor β can be predetermined according to the power level of the apparatus and the materials used in the apparatus. The advantages of the apparatus increase as the power levels of the apparatus increases. In particular, the invention has distinct reliability advantages over the prior art for lasers having output powers greater than 1 kW.

The glass outer cladding of the taper may comprise fluorosilicate.

The glass may be a long wavelength glass. Typically this might be a wavelength of 2 μm or more. The glass may be in the range of 2 μm-5 μm.

The output fibre numerical aperture $NA_F$ may be greater than or equal to 0.4.

The taper may comprise at least one optical fibre. The optical fibre may be substantially single mode.

The plurality of inputs may comprise a bundle of optical fibres.

The glass outer cladding may comprise a capillary.

The taper may comprise a hollow bore.

The diameter $D_{CMS}$ may be optimised to minimise heating of the polymer coating of the output optical fibre without substantially increasing the loss of the apparatus.

The taper may have a diameter that reduces monotonically along its length.

The cladding mode stripper may comprise variations in a thickness of the glass cladding. The variations may be substantially periodic.

The glass cladding may have a higher loss in the region of the cladding mode stripper than elsewhere.

The taper may be defined by a taper angle that varies along its length. The taper may comprise an untapered region, and the cladding mode stripper may be positioned in the untapered region.

The cladding mode stripper may comprise an outer layer that surrounds the glass cladding.

The factor β may be less than 0.95. Preferably the factor β is less than 0.90.

The cladding mode stripper may comprise glass or a glass frit.

The cladding mode stripper may comprise silver solder.

The cladding mode stripper may be one that does not contain polymers, fluids, and gels.

The cladding mode stripper may comprise a polymer cladding surrounding a portion of the taper.

A common previously proposed method of assembling N:1 fibre-optic combiners is to load N fibres into a pre-tapered outer capillary tube ('starting tube'). The capillary and fibres are then simultaneously fused/tapered to produce a single bundle of fibres that can be cleaved and spliced to an output fibre. The capillary surrounding the fibres can be considered to be an integral part of the combiner.

One example is a multimode pump combiner that combines the output from multiple fibre-coupled diode sources into a single output fibre. Depending on the input divergence of the diodes and the taper ratio used, then light will be coupled into the capillary. This is generally undesirable as it contributes to an increase in the divergence of the output. Effectively the presence of the outer capillary reduces the brightness of the multimode combiner. For this reason, the thickness of the outer capillary is kept to a minimum, which leads to practical difficulties when assembling such a combiner.

An alternative is to assemble a combiner without the use of an outer capillary. Depending on the value of N, this can be complex to achieve. Many methods involve mechanical schemes that act on individual fibres in order to assemble a close-packed bundle. These schemes are required to both provide a mechanism for aligning the fibres in a close-packed geometry and also optionally to provide a twist that prevents the fibres from splaying outwards as the fibres are subsequently heated/tapered. In order to achieve this, some methods use tensioning of individual fibres. A close-packed geometry is required in order that the assembled bundle of fibres adopts a near-circular cross-section. For commonly used values of N (e.g. 7, 12, 19), the preferred cross-section is a hexagonal geometry.

In addition to the complexity involved in assembling these fibre bundles, adhesive is often used to fix the twisted fibres relative to each other. The thermal handling capability of this adhesive can limit the power handling of the combiner.

In a further aspect, the invention provides a bundle comprising a plurality of input optical fibres, formed of glass, and an output optical fibre, forming a taper, fusing the taper to the output optical fibre, and making at least one cladding mode stripper to strip out higher order modes that would otherwise degrade a polymer coating on at least one of the input optical fibres and the output optical fibre.

In a yet further aspect the invention provides a method of forming an optical combiner, comprising providing a bundle of input optical fibres; mounting the bundle between two spaced apart portions of capillary tube, with an exposed region of the fibre bundle between the two capillary tube portions; applying localised heat to the two portions of capillary tube to fuse the capillary tube, at the regions to which heat is applied, to at least the outer layer of the fibres in the bundle; tapering and fusing a part of the exposed region of fibres to produce a single bundle of fused fibres; cleaving the fused bundle and splicing the cleaved bundle to an output fibre.

Thus, control of individual fibres is not needed.

In one example the steps are as follows:

Produce a 'starting tube' (outer capillary), tapered to a waist so that the inner diameter provides a tight-fit to the closely packed bundle of N input fibres.

Load N stripped fibres so that fibres fill most of the waist region. The fibres are loaded from the 'near' end of the tube.

Cleave the start tube in the waist region.

Apply localised heat to the 'far' end of the tube in order to fuse the fibres to the tube and (optionally*) to each other.

(these last two steps could be reversed)

Cleave the tube in a section of the waist non-adjacent to the fused region. The intention is to only cleave the tube, not the fibres.

Slide the 'near' end of the tube away from the cleave point to produce a region of exposed fibres.

Apply localised heat to the 'near' end of the tube in order to fuse the fibres to the tube and to each other.

Optionally, rotate one (or both) of the ends of the tube to produce a twist of the fibres.

Optionally, fuse the fibres together by applying heat (prior to tapering).

Fuse and taper the exposed fibres to produce a single bundle of fused fibres.

Cleave the fused bundle at the required diameter.

Splice the cleaved bundle to an output fibre.

Depending on the level of heating during the two initial fusion operations, the tube and fibres may not be totally fused together. It is possible that the tube and only the outer layer of fibres are fused together. This may be an advantageous feature, as the subsequent rotation of the tube will only affect the outer fibres. It is these fibres that are required to be prevented from becoming detached from the bundle during the final taper process.

In some non-limiting modifications of the method the capillary may extend over the taper region, and may be tapered itself. A cladding mode stripper may be formed at the taper or at another region of the capillary or input fibre bundle.

BRIEF DESCRIPTION OF THE DRAWINGS

Embodiments of the invention will now be described solely by way of example and with reference to the accompanying drawings in which.

DETAILED DESCRIPTION

Figure 1:
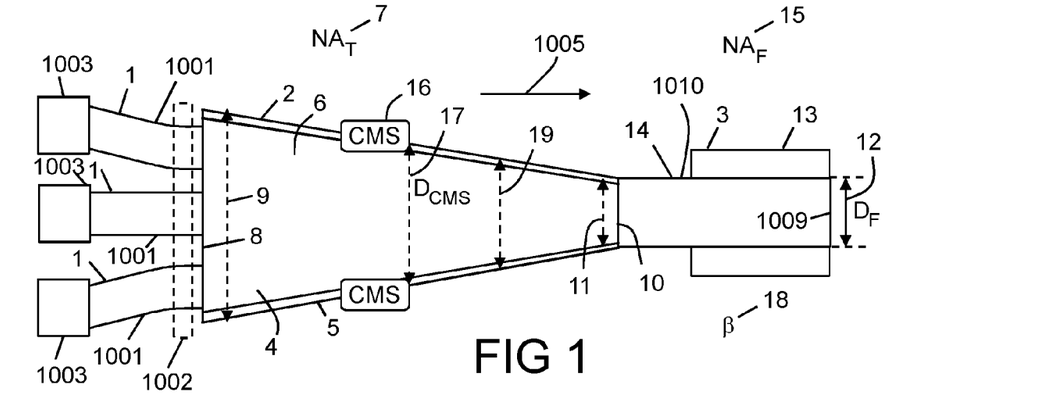
FIG. 1 shows apparatus for combining optical radiation according to the present invention.

With reference to FIG. 1, there is provided apparatus for combining optical radiation, which apparatus comprises a plurality of inputs 1, a taper 2 formed from glass 6, and an output optical fibre 3, wherein: the taper 2 comprises a waveguide 4 having a glass outer cladding 5, which waveguide 4 is defined by a numerical aperture $NA_T$ 7; the taper 2 has a first end 8 having a first diameter 9, and a second end 10 having a second diameter 11; the first diameter 9 is greater than the second diameter 11; the plurality of inputs 1 are coupled to the first end 8;

the second end 10 is coupled to the output optical fibre 3; the output optical fibre 3 is defined by a fibre diameter $D_F$ 12; the output optical fibre 3 comprises a polymer coating 13; the output optical fibre 3 is defined by a numerical aperture $NA_F$ 15; the apparatus being characterized in that: the taper 2 comprises a cladding mode stripper 16 located at a diameter $D_{CMS}$ 17 equal to a fraction, the numerator of which is the product of the fibre diameter $D_F$ 12, the numerical aperture $NA_F$ 15, and a factor β 18, and the denominator of which is the numerical aperture $NA_T$ 7, such that $D_{CMS}=D_F \cdot NA_F \cdot β/NA_T$; the factor β 18 is less than or equal to 1.0; thereby ensuring that higher angle rays (not shown) propagating along the taper 2 towards the output optical fibre 3 are attenuated thus reducing or eliminating damage to the polymer coating 13.

The taper 2 is shown as being made from the glass 6 that is surrounded by the glass outer cladding 5. The glass 6 may be silica, and the glass outer cladding 5 may comprise, or may be, fluorosilicate. Alternatively, the glass 6 and the cladding 5 may be long wavelength glasses, such as a heavy metal fluoride glass (ZBLAN glass) or a chalcogenide glass. Such long wavelength glasses have advantages in the 2 μm to 5 μm wavelengths owing to their superior transmission compared to silica-based glasses. The numerical aperture $NA_T$ 7 may be at least 0.15, and preferably greater than or equal to 0.22.

The output optical fibre 3 is shown as being made from a glass 14 that is coated with the polymer coating 13. The output optical fibre 3 is shown as having a bare fibre section 1010 that is not coated with the polymer coating; this section can be recoated with polymer or other materials if desired. The numerical aperture $NA_F$ 15 can be defined with reference to the refractive index of the polymer coating 13 and the refractive index of the glass 14, the larger the differences in these refractive indices, the larger the numerical aperture 15. The numerical aperture $NA_F$ 15 can be greater than or equal to 0.2, preferably greater than or equal to 0.4, and more preferably greater than or equal to 0.45. The polymer coating 13 is preferably made from a polymer has a refractive index substantially lower than the refractive index of the glass 14, which may be silica. Preferably the numerical aperture $NA_F$ 15 is greater than the numerical aperture $NA_T$ 7. More preferably, the numerical aperture $NA_F$ 15 is at least twice as high as the numerical aperture $NA_T$ 7. In general, the higher the ratio of $NA_F$ 15 to $NA_T$ 7, the more inputs 1 can be combined without suffering undue loss.

The taper 2 can have a diameter 19 that varies monotonically along its length 1005.

Figure 2:
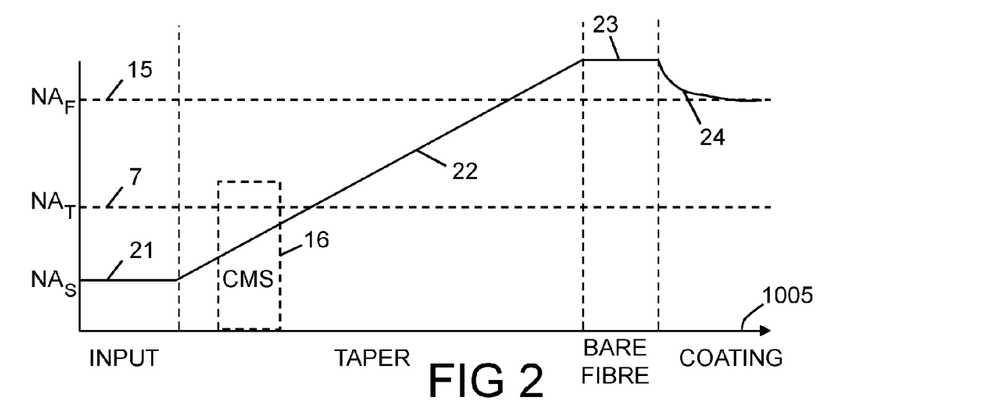
FIG. 2 shows the variation of numerical aperture of light as it propagates along the taper.
Figure 3:
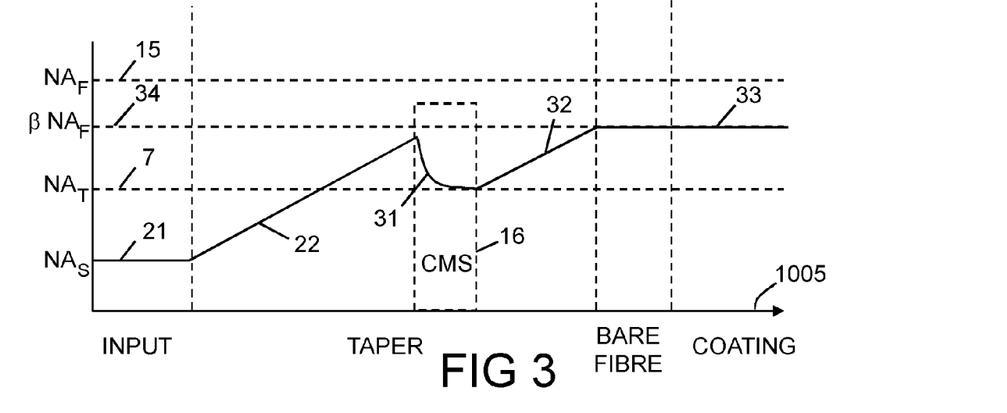
FIG. 3 shows the reduction of numerical aperture of light as it encounters a cladding mode stripper.

An important advantage of the invention is that higher angle rays are attenuated in the taper 2, and thus do not reach the polymer coating 13 of the output optical fibre 3. This is illustrated in FIGS. 2 and 3. FIG. 2 shows the variation in numerical aperture 22 of light as it propagates along the apparatus of FIG. 1. The numerical aperture 22 is the maximum cone angle of the light with respect to its propagation direction. The numerical aperture 22 of light propagating in the input 1 is shown as being equal to a numerical aperture $NA_S$ 21. Preferably the taper 2 is an adiabatic taper that maintains the brightness of the light propagating along it. Thus as the diameter 19 (shown with reference to FIG. 1) reduces along the taper 2, the numerical aperture 22 increases. The cladding mode stripper 16 is located in a region of the taper 2 where the numerical aperture 22 is less than the numerical aperture $NA_T$ 7. Consequently, light is guided by the waveguide 4 (comprising the glass 6 and the glass outer cladding 5). Light does not enter the glass outer cladding 5, and thus light is not removed from the glass outer cladding 5. The numerical aperture 22 thus continues increasing, and in the example, becomes greater than the numerical aperture $NA_F$ 15 of the output fibre 3. Light can thus enter the polymer coating 13 where it will be absorbed. The numerical aperture 22 thus reduces as the light propagates along the output fibre 3. For high power lasers (output power greater than 100 W), this absorbed light can damage the polymer coating 13 leading to unreliability.

In the above, a distinction is drawn between the two numerical apertures $NA_T$ 7 and $NA_F$ 15, and the numerical aperture 22. The former represent the maximum cone angles that can be supported by their respective waveguides.

If a waveguide has a refractive index of the core $n_{co}$ and a refractive index of the cladding $n_{cl}$, then the maximum cone angle that the waveguide can support is equal to $(n_{co}^2 - n_{cl}^2)^{0.5}$, and this is defined as its numerical aperture. These numerical apertures are quite distinctly different from the numerical aperture 22 of the light that is propagating through the taper 2, which numerical aperture 22 should be less than the numerical aperture $NA_F$ 15 to prevent the light entering into, and burning, the polymer coating 13.

Preferably the cladding mode stripper 16 is one that does not include polymeric material, gels or liquids. More preferably, the cladding mode stripper 16 consists entirely of glass. This is advantageous because an all-glass cladding mode stripper is inherently more robust, with higher thermal and power capabilities, than alternative cladding mode strippers that incorporate polymers, gels or liquids.

In FIG. 3, the cladding mode stripper 16 is located in a region where the numerical aperture 22 is greater than the numerical aperture $NA_T$ 7 of the taper 2. As a consequence, light having a numerical aperture 22 greater than $NA_T$ 7 will propagate in the glass outer cladding 5, which light can be removed by the cladding mode stripper 16. Thus the numerical aperture 22 reduces (as shown by label 31) as higher angle rays are removed from the light propagating along the taper 2. Light continues to propagate along the taper 2 after the cladding mode stripper 16 with a numerical aperture 32 which increases along the taper 2 as shown. The resulting numerical aperture 33 is smaller than the numerical aperture $NA_F$ of the output fibre 3, and is thus guided by the output fibre 3 without penetrating into the polymer coating 13. If the taper 2 is adiabatic, the resulting numerical aperture 33 will be equal to the numerical aperture $\beta \cdot NA_F$ 34, which is the product of the factor $\beta$ 18 and the numerical aperture $NA_F$ 15 of the output fibre 3. Alternatively, if the taper 2 is not adiabatic, the numerical aperture 32 will increase more rapidly, and the resulting numerical aperture 33 will be higher than the numerical aperture $\beta \cdot NA_F$ 34. It is important that the resulting numerical aperture 33 is lower than the numerical aperture $NA_F$ 15 of the output fibre 3, preferably at most 90% of the numerical aperture $NA_F$ 15 of the output fibre 3, and more preferably, at most 85% of the numerical aperture $NA_F$ 15 of the output fibre 3. The ability to adjust the factor $\beta$ 18, and hence the diameter $D_{CMS}$ 17 of the cladding mode stripper 16, provides the ability to fine tune the resulting numerical aperture 33 and hence the safety margin built into the product. The safety margin can be viewed as being equal to $(1-\beta)$, thus if $\beta=0.9$, then the safety margin is 10%, and if $\beta=0.8$, then the safety margin is 20%.

If the resulting numerical aperture 33 is higher than the numerical aperture $NA_F$ 15 (for example by virtue of unintended mode coupling in the taper 2) then optical power will be absorbed by the polymer coating 13, and the polymer coating 13 heat up as a consequence. The absorbed optical power is wasted in that it is not emitted from the output fibre 3. A solution is to change (or tune) the cladding mode stripper 16 with a cladding mode stripper that removes more cladding modes. Alternatively or additionally, the factor $\beta$ 18 can be reduced such that the diameter $D_{CMS}$ 17 is smaller. This results in the same higher angle rays that would be absorbed by the polymer coating 13 being removed by the cladding mode stripper 16 instead. However, if the factor $\beta$ 18 is made too small, then the cladding mode stripper 16 can begin to remove rays that would not be absorbed by the polymer coating 13, and the overall loss of the apparatus would then increase. It can therefore be desirable to select the factor $\beta$ 18 to minimize the heating of the polymer coating 13 without substantially increasing the loss of the apparatus. Here, the loss of the apparatus shown with reference to FIG. 1 is defined as the reduction in intensity of a light beam travelling from one of the inputs 1 through the taper 2 and emitted from an end 1009 of the output fibre 3.

With reference to FIG. 1 (and to all the other embodiments discussed later) it is generally preferable that the cladding mode stripper 16 is not located at diameters 19 that are less than the diameter $D_{CMS}$ 17. If the cladding stripper 16 is effective at stripping modes from the cladding 5, then if the cladding mode stripper 16 extends to diameters 19 that are less than the diameter $D_{CMS}$ 17, then the numerical aperture 31 will be clamped at approximately the numerical aperture $NA_T$ 7. This would cause an under filling of the numerical aperture $NA_F$ 15 of the output fibre 3 if $NA_F$ 15 is more than 50% greater than the numerical aperture $NA_T$ 7 of the taper 2.

The ability to adjust, or fine-tune, the resulting numerical aperture 33 is also useful if a different value of $NA_T$ 7 is chosen, to compensate for small variations in $NA_T$ 7, to accommodate higher or lower optical powers, or to accommodate different sources having different numerical apertures $NA_S$ 21. Similarly, it also allows for correction of variations in the numerical aperture $NA_S$ 21 of the source.

The diameter $D_{CMS}$ 17, and hence the position, of the cladding mode stripper 16 can be adjusted while the cladding mode stripper 16 is manufactured. For example, with reference to FIG. 1, the apparatus shown can be assembled, and light from at least one of the sources 1003 can be injected into the taper 2. Alternatively, light from a calibrated source (not shown) can be used. Then the cladding mode stripper 16 can be manufactured and positioned while monitoring and feeding back information from at least one of the amount of light being stripped by the cladding mode stripper, the light being absorbed by the polymer cladding 13, and the power emitted from the output fibre 3. The monitoring can be performed using thermal techniques, for example using a thermal imaging camera. Alternatively or additionally the monitoring can be performed using optical techniques, for example using a photodetector or camera. An alternative method would be to monitor the optical output from the second end 10 while the cladding mode stripper 16 is manufactured prior to connecting the taper 2 to the output fibre 3. In this case, the numerical aperture 22 of the output light can be monitored by for example, using near field or far field techniques that are well known in the industry. The cladding mode stripper 16 would be adjusted until the output light had the desired numerical aperture 33 shown with reference to FIG. 3.

The invention is thus important for optical fibre lasers and amplifiers that have powers greater than around 100 W because such coatings 13 are often made using polymers. These polymers can degrade if optical power leaks from the glass fibre 3 into the coating 13. Such leakage can be reduced or completely eliminated by ensuring that there is a sufficient factor $\beta$ 18. Importantly, by tailoring the position of the cladding mode stripper 16 along the taper 2, it is possible to fine tune the factor $\beta$ 18. Alternatively or additionally, the factor $\beta$ 18 can be predetermined according to the power level of the apparatus and the materials used in the apparatus. The advantages of the apparatus increase as the power levels of the apparatus increases. In particular, the invention has distinct reliability advantages over the prior art for lasers having output powers greater than 1 kW.

The cladding mode stripper 16 will also strip light that is reflected back and propagates from the second end 10 to the first end 8. Such back reflected light can be reflected from a work piece being cut, welded or marked, from undesirable reflections between components, or from non-linear effects such as Raman scattering. Removing back scattered light is advantageous because it can avoid unwanted light being fed back to the optical sources 1003.

Referring to FIG. 1, the plurality of inputs 1 may comprise a bundle 1002 of optical fibres 1001. The optical fibres 1001 may be optical fibres providing radiation from optical sources 1003. The optical sources 1003 may be diode lasers, fibre lasers, disk lasers, rod lasers, or other solid state lasers. The optical sources 1003 may be laser diode modules emitting pump radiation, which pump radiation is combined in the taper 2, and output to the optical fibre 3. The optical fibre 3 may be a lasing medium such as a rare earth doped double clad fibre. Alternatively, the optical sources 1003 may be high power lasers each emitting greater than 100 W, preferably greater than or equal to 500 W, and more preferably greater than or equal to 1 kW.

Figure 4:
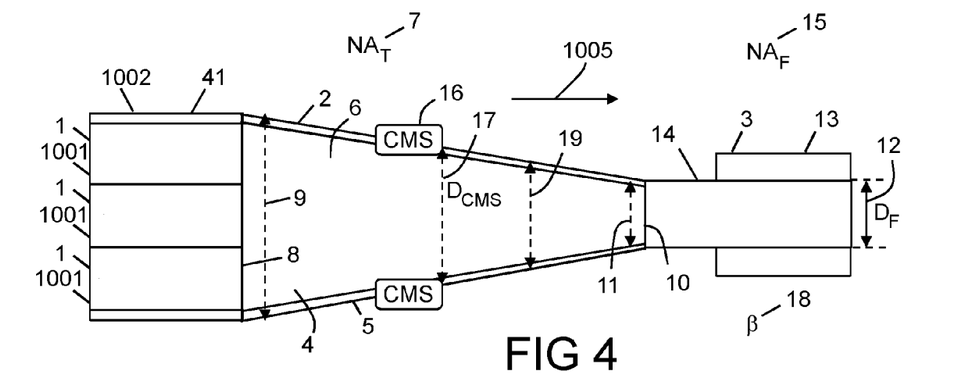
FIG. 4 shows a combiner that includes a bundle of optical fibres in a glass capillary.

The bundle 1002 of fibres 1001 may comprise a glass capillary 41 as shown with reference to FIG. 4. The fibres 1001 and the glass capillary 41 can be fusion spliced to the taper 2 at the first end 8. The fibres 1001 may be silica fibres, and the glass capillary 41 may be a fluorosilicate glass capillary. The silica fibres may be single mode or multimode fibres, or may be pure silica rods.

Figure 5:
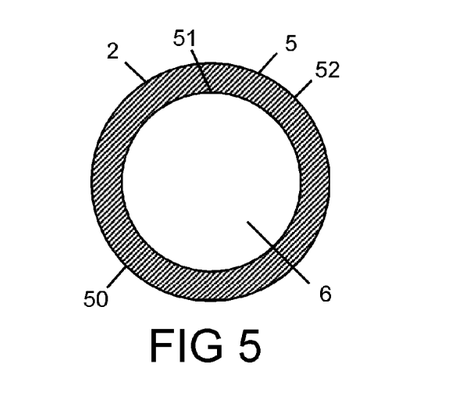
FIG. 5 shows a cross section of a taper which comprises a single fibre and an outer cladding.

As shown with reference to FIG. 5, the taper 2 can be formed from a fibre 50 that has a core 51 and a glass cladding 52 that has a refractive index lower than a refractive index of the core 51. The core 51 can be silica, and the glass cladding 52 can be fluorosilicate. The fibre 50 is drawn into the taper 2 by applying heat.

Figure 6:
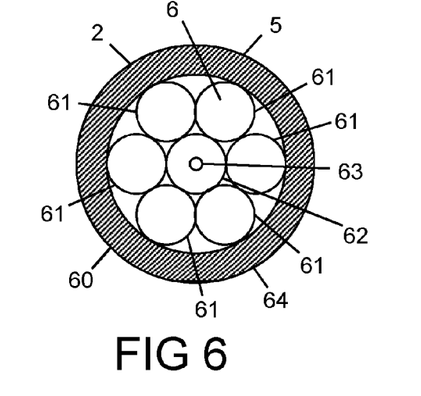
FIG. 6 shows a cross section of a taper that includes a plurality of fibres.

As shown with reference to FIG. 6, the taper 2 can be formed from an assembly 60 of optical fibres 61 that is surrounded by a glass capillary 64. The optical fibres 61 may be made from silica, and the glass capillary 64 may be made from fluorosilicate. The assembly is drawn into the taper 2 by applying heat. The number of fibres in the assembly is typically 7, 12 or 19 but other numbers are possible.

When manufacturing the apparatus shown in FIG. 4 from the assembly 60, it is preferable that the fibres 1001 are the same fibres 61, 62 shown with reference to FIG. 6, and the glass capillaries 41, 2 are the same glass capillary 64 also shown with reference to FIG. 6. When the assembly 60 is drawn to form the taper 2 using heat, the transition from the fibre bundle 1002 to the taper 2 is contiguous, and thus there is no need to join or fusion splice the fibres 1001 in the bundle 1002 to the fibres 61, 62 in the taper 2.

The assembly 60 of FIG. 6 is shown as comprising a central fibre 62 that has a core 63. The central fibre 62 may be a single mode fibre, or a multimode fibre. This is particularly advantageous if it is desired to propagate a beam with high brightness through the taper 2 into the output fibre 2. However, if this is not required, then the central fibre 62 may be replaced with a fibre without a core such as one of the fibres 61.

Figure 7:
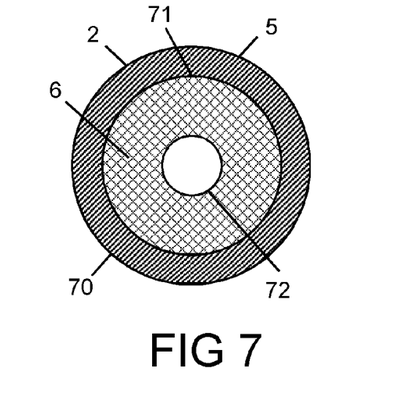
FIG. 7 shows a cross section of a taper that includes a capillary.

As shown with reference to FIG. 7, the taper 2 can be formed from a glass capillary 70 comprising a core 71 and a glass cladding 5. The core 71 may be made from silica, and the glass cladding 5 can comprise fluorosilicate. The taper 2 has a hollow bore 72 extending along the taper 2. An example of such a taper is described in U.S. Pat. No. 7,720,340, which describes an annular tapered combiner having a feed-through fibre.

Figure 8:
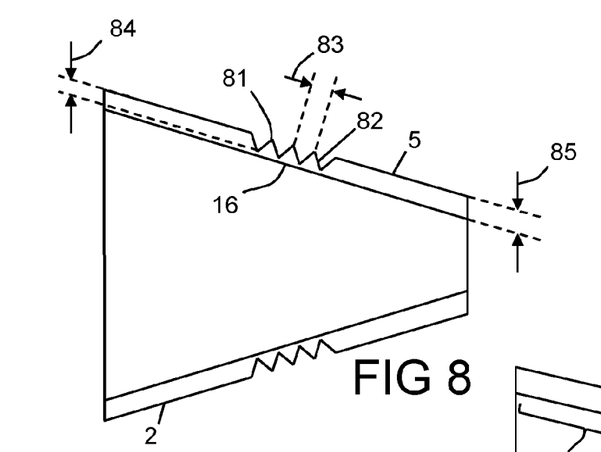
FIG. 8 shows a taper comprising an integral cladding mode stripper.

FIG. 8 shows a cladding mode stripper 81 that comprises variations 82 in a thickness 85 of the glass outer cladding 5. The variations 82 may be substantially periodic with a period 83. The period 83 can either be uniform between the variations 82, or may be different. The variations 82 can be manufactured using a carbon dioxide laser to cut away the cladding 5, or by etching using an acid such as hydrofluoric acid. The variations 82 are shown as being triangular in shape. However U shaped grooves and other shapes are also possible. The variations 82 should have a minimum cladding thickness 84 less than 20 μm, preferably less than 10 μm, and more preferably less than 5 μm. The period 83 should be less than 250 μm, preferably less than 100 μm, and more preferably less than 50 μm. The variations 82 can be circularly symmetric, can spiral around the taper 2, or can be in the form of discrete linear cuts. If a carbon dioxide laser is used to cut away the cladding 5, the output of the taper 2 could be actively monitored using, for example, a mid infrared camera, while the cladding mode stripper 81 is being manufactured in order to optimize the amount of higher order modes that are removed.

Figure 9:
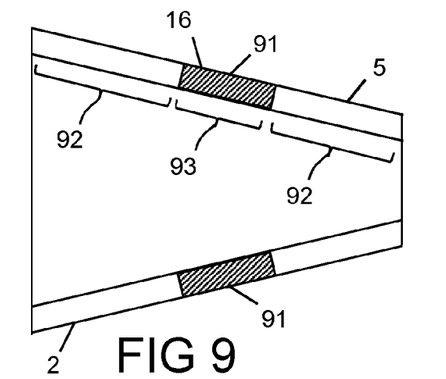
FIG. 9 shows a taper in which the cladding mode stripper is located in the cladding.

As shown in FIG. 9, the taper 2 can have a cladding mode stripper 16 formed in the cladding 5. The cladding 5 has a higher loss in a region 92 of the cladding mode stripper 16 than in a region 92 adjacent to the cladding mode stripper 91. Loss can be introduced by doping the glass cladding 5, by introducing imperfections in the glass cladding 5, for example, with a focused picosecond or femtosecond laser, or by causing surface roughness in a surface 91 of the cladding mode stripper 16. Surface roughness can be created by chemical etching, for example as described in U.S. Pat. No. 8,433,161, which patent is incorporated by reference herein. Surface roughness can also be created by sputtering materials, such as silica, onto the surface.

Thus, the taper may comprise a cladding mode stripper formed by modifying part of a cladding layer of the taper.

Figure 10:
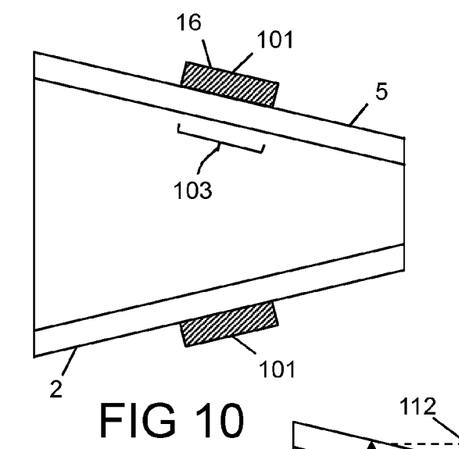
FIG. 10 shows a taper in which the cladding mode stripper comprises a material adjacent the cladding.

As shown in FIG. 10, the cladding mode stripper 16 can comprise a cladding 101 adjacent to a portion 103 of the taper 2. The cladding 101 can be a polymer, such as silicone, that does not degrade at elevated temperatures and that has a refractive index at least equal to the refractive index of the outer glass cladding 5. The refractive index of the cladding 101 is preferably substantially equal to the refractive index of the outer glass cladding 5. Preferably, the cladding 101 is a glass solder, or a solder such as silver solder, that can fix the taper to a heat sink (not shown). Silver solder has the advantage of being able to absorb light transmitting in the cladding 5, and to transmit the resulting heat generated by the absorbed light efficiently to a heat sink (not shown). Glass solder, also referred to as solder glasses or frit glasses, are special glasses with a particularly low softening point (below 550° C.). They are used to join glass to other glasses, ceramics, or metals without thermally damaging the materials to be joined. To ensure stress-free sealing, the coefficient of thermal expansion (CTE) needs to be closely matched to the sealing partners, which in this case is the glass of the taper 2. Solder glasses can be bought from Schott AG of Mainz, Germany.

Figure 11:
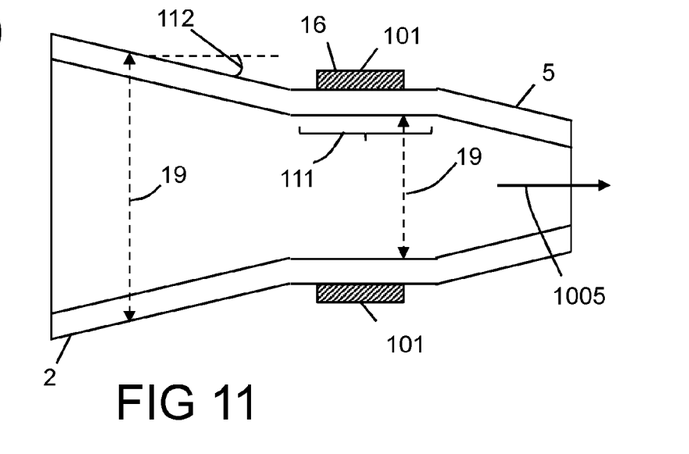
FIG. 11 shows a taper comprising a cladding mode stripper located in a region in which a taper angle does not vary.

As shown with reference to FIG. 11, the taper 2 has a region 111 in which the diameter 19 and thus taper angle 112 do not vary along its length 1005. The cladding mode stripper 16 is located in the region 111. The cladding mode stripper 16 is shown as being the cladding mode stripper 101 of FIG. 10. However, any of the cladding mode strippers described herein can be used in this arrangement, as well as other known types. This arrangement offers the advantage of allowing for longer cladding mode strippers 16 to be produced, so providing more efficient cladding light removal.

Figure 12:
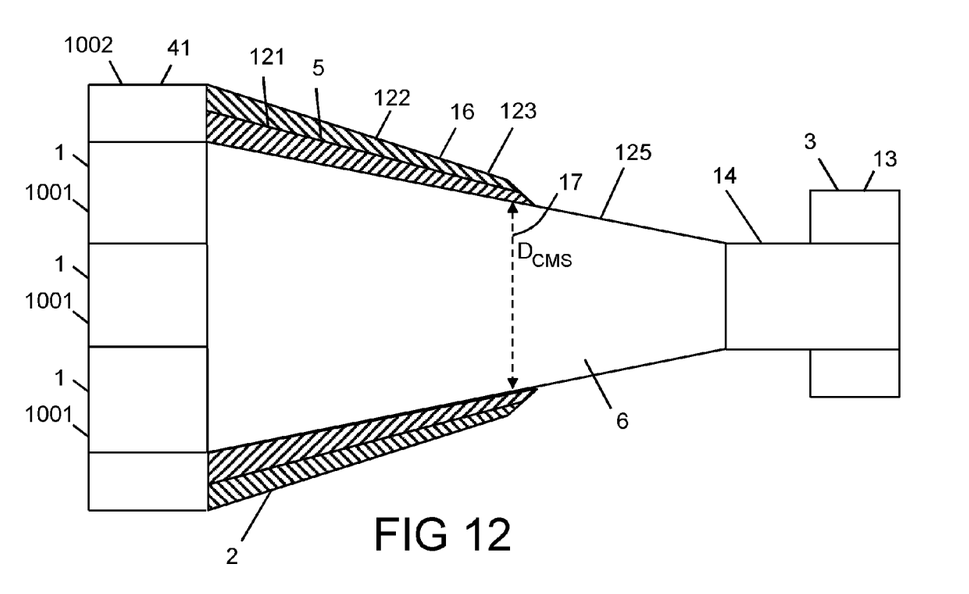
FIG. 12 shows a taper comprising an outer layer.

A cladding mode stripper 123 is shown with reference to FIG. 12, which cladding mode stripper comprises an outer layer 122 surrounding the glass cladding 5. The outer layer 122 is preferably formed of glass that is highly absorbing or scattering, and has a refractive index that is equal to or greater than the refractive index of the glass cladding 5. Light propagating along the taper 2 that has a numerical aperture 22 greater than the numerical aperture $NA_T$ 7 will then pass through the glass cladding 5 and into the outer layer 122. It is preferred that the outer layer 122 has an attenuation greater than 1 dB/mm. The outer layer 122 may comprise titanium dioxide. The outer layer 122 may be a metal coating, such as gold, that is evaporated onto the taper 2. Alternatively or additionally, the outer layer 122 may comprise defects that scatter the light, such as bubbles, or voids, or defects written using picoseconds or femtosecond lasers, or have the cladding mode stripper 81 etched or laser machined into its surface such as shown with reference to FIG. 8. Advantageously, the outer layer 122 can be chemically etched at a different rate to the glass cladding 15 by selecting an appropriate chemical etching fluid or gel. The glass cladding 15 can therefore either be removed completely from a region 125 of the taper 2 (as shown in FIG. 12), or be left intact over the entire taper 2.

Various cladding mode strippers 16 are shown and described with reference to particular embodiments. However, any of the cladding mode strippers 16, 81, 91, 101 and 123 can be used in any of the tapers 2 shown in FIGS. 1, 4, and 8-12. Preferably the cladding mode stripper 16 is one that does not contain polymers, fluids, and gels. Preferably the cladding mode stripper 16 comprises glass, or a glass frit. The cladding mode stripper 16, including those shown with reference to FIGS. 1, 4, 10, 11 and 12, may have a rough surface 92 as shown with reference to FIG. 9. The factor β 18 can be less than 0.95. Preferably the factor β is less than 0.90.

The bundle of fibres may comprise just three fibres (in which case all will be "outer" fibres) or other numbers. One example has 7 fibres (eg one inner and 6 outer fibres). Other numbers of fibres are possible: 3, 4, 5 12, 19, 37 and 61 are commonly used examples but other numbers are possible. Furthermore, it is possible to assemble a bundle that includes both fibres and one (or more) capillaries.

Figure 13:
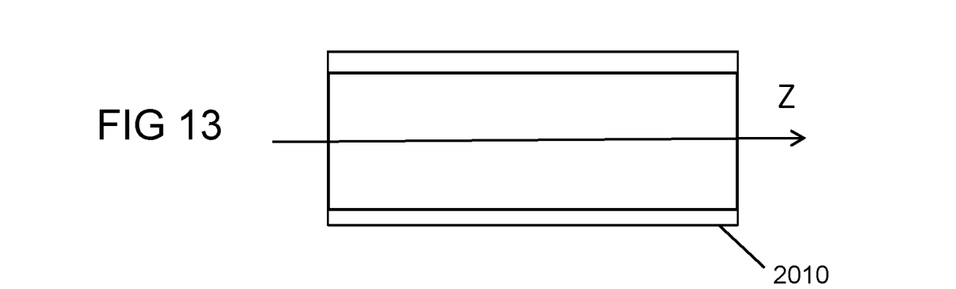
FIGS. 13 to 20 show steps in a method of forming an optical combiner.

One method for forming a combiner will now be disclosed with reference to FIGS. 13 to 20. Other methods may be used. The method described below involves the use of a capillary, but does not require control of individual fibres. The steps involved are as follows:

Produce a 'starting tube' (outer capillary) (2010), tapered to a waist (2020) so that the inner diameter provides a tight-fit to the closely packed bundle of N input fibres (1001).

Figure 15:
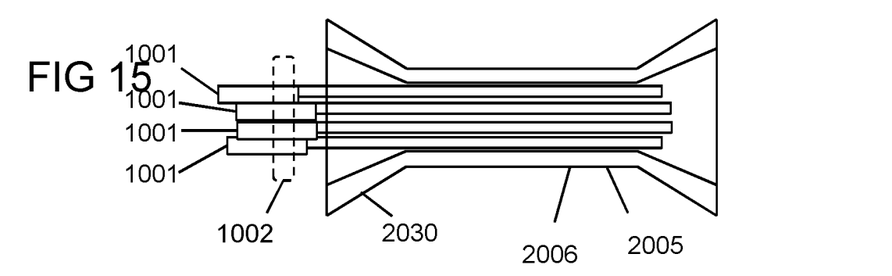

Load N stripped fibres (1001) so that fibres fill most of the waist region. The fibres are loaded from the 'near' end of the tube.

Cleave the start tube in the waist region (2020).

Apply localised heat to the 'far' end of the tube (2005) in order to fuse the outer fibres to the tube. This step might also fuse the fibres to each other.

(these last two steps could be reversed)

Cleave the tube in a section of the waist non-adjacent to the fused region. The intention is to only cleave the tube, not the fibres.

Slide the 'near' (ie unfused) end of the tube away from the cleave point to produce a region of exposed fibres.

Apply localised heat to the 'near' end of the tube (2009) in order to fuse the fibres to the tube and to each other.

Optionally, rotate one (or both) of the ends of the tube to produce a twist of the fibres.

Optionally, fuse the fibres together by applying heat (prior to tapering).

Figure 18:
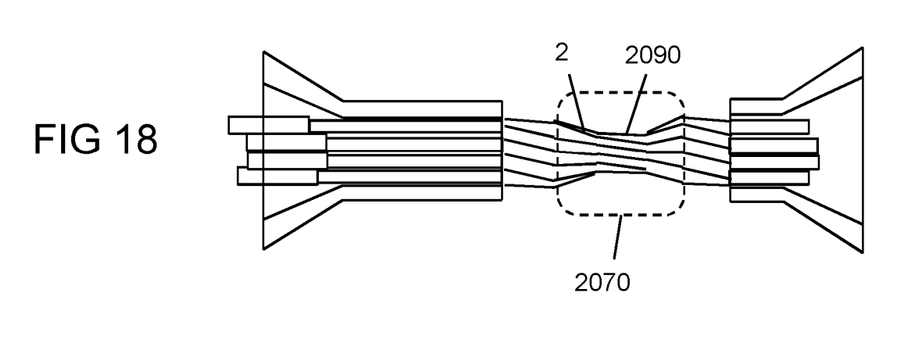

Fuse and taper the exposed fibres to produce a single bundle of fused fibres (2070).

Figure 19:
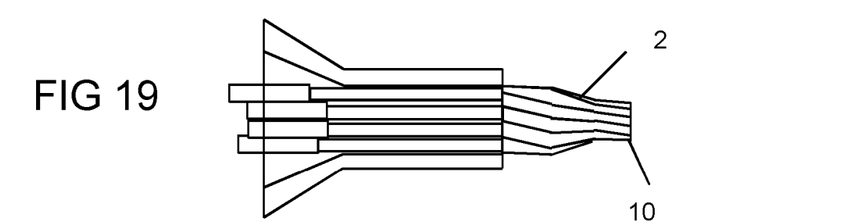

Cleave the fused bundle at the required diameter (2090).

Figure 20:
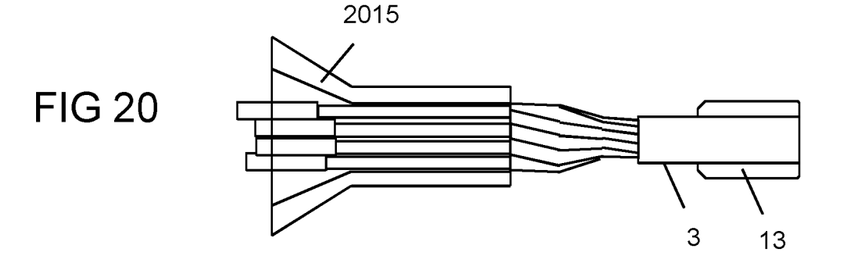

Splice the cleaved bundle to an output fibre (3).

Depending on the level of heating during the two initial fusion operations, the tube and fibres may not be totally fused together. It is possible that the tube and only the outer layer of fibres are fused together. This may be an advantageous feature, as the subsequent rotation of the tube will only affect the outer fibres. It is these fibres that are required to be prevented from becoming detached from the bundle during the final taper process.

The method described above offers significant advantages over existing methods of assembling fibre bundles without the use of capillary in that no complex mechanics is required and no adhesive is used to retain the fibres in position once the fibre bundle has been assembled.

Note that the use of a length of tapered capillary is useful to ensure the fibres are close-packed in the required geometry. The capillary is tapered as this allows the user to reliably produce the required inner diameter for close-packed fibres. This capillary could equally well be sourced with the correct inner diameter and so removing the need to taper. However it is also more convenient to load a bundle of fibres into a tube with a larger inner diameter than required for close-packing and to then slide the fibres into a region that is correctly sized. Furthermore, an oversized tube allows for the coated portion of the fibres to be located inside the tube, so improving robustness.

During the process described above, the starting tube is cleaved in order to produce two separate lengths of capillary. This in turn allows a section of the fibres to be exposed. Cleaving is only required as a consequence of the use of a single piece of capillary to create the close-packed bundle. An alternative would be to use two separate sections of tube in some circumstances, however, this might create practical difficulties in loading the fibres into the two pieces of tube.

The two ends of the cleaved tubes can be used to secure the fibres, as is required in order for them to be tapered. The use of a glass tube allows for the fibres and tube to be fused together using a non-contact method (e.g. plasma) and importantly removes the need to apply adhesive, which would be difficult to subsequently remove and so would limit the use of the device at high optical powers. The tube also provides a convenient method of clamping the bundle without directly contacting the fibres.

If the fusion is applied at the discard end of the bundle first, then any misalignment between the two sections of tube is corrected for before the taper process is executed.

Loading a bundle of fibres into a single tapered length of tube is a convenient practical method of producing a close-packed arrangement. Cleaving this single tube then allows for a section of the close-packed fibre bundle to be exposed and fused. The choice of a glass tube allows for the fibres to be fused at both ends of the region to be tapered, thus providing a method of securing the fibres without compromising the optical power-handling of the device.

Figure 14:
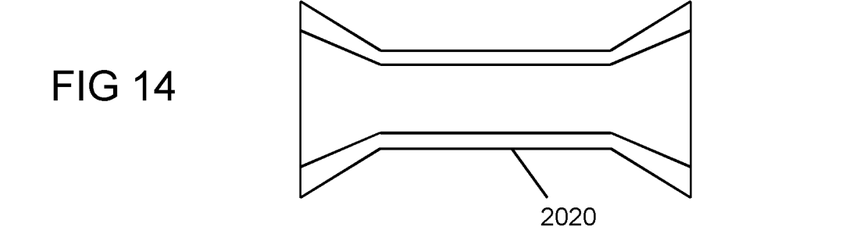

The figures below also describe this process:

FIG. 13 shows a glass tube 2010 having an axis of rotational symmetry Z. This tube is, if required, tapered or otherwise modified to produce a portion 2020 that has an inner diameter that provides a close fit to one or more optical fibres (FIG. 14). These input fibres 1001 are inserted into the near end of the tube 2030 (FIG. 15). The fibres 1001 consist of a core and a cladding, whereby the cladding has a lower refractive index with respect to the refractive index of the core.

At a position 2005 along the close-fitting portion 2020, heat is applied in order to provide fusion between at least the outer fibres in the bundle and the glass tube. The glass tube is then cleaved at a position 2006 on the close-fitting portion of the tube 2020, where 2006 lies between 2005 and the near end of the tube 2030.

Figure 16:
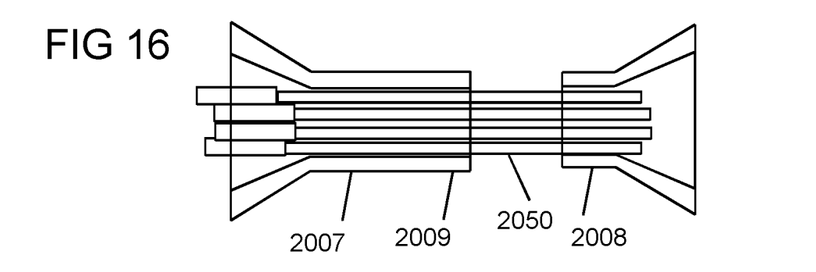

The two discrete pieces 2007 & 2008 of the tube can then be separated by sliding one or both parts away from each other parallel to Z (FIG. 16). This produces an exposed section 2050 of fibres which are no longer surrounded by the glass tube. At a position 2009 along the close-fitting portion of assembly 2007, heat is applied in order to provide fusion between at least the outer fibres in the bundle and the glass tube.

Figure 17:
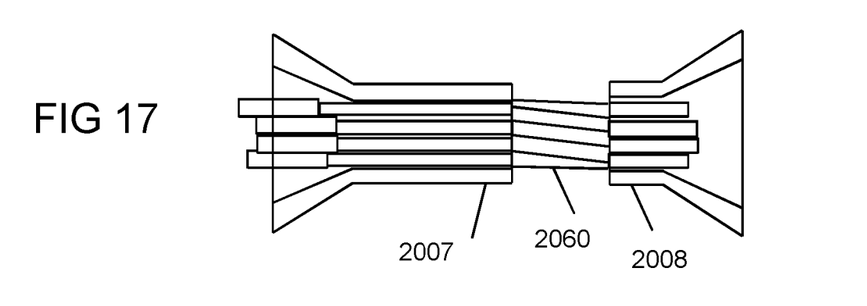

One option is that one or both of the portions of tube 2007 & 2008 is rotated about Z in order to induce a twist to at least the outer layer of fibres 2060 within the bundle (FIG. 17). Alternatively the bundle of fibres could be lightly fused in order to ensure that each fibre is in close-contact with its' neighbouring fibres.

The bundle of exposed and (optionally) twisted fibres 2060 is then tapered to produce a region of fused fibres 2070 (FIG. 18) that includes a tapered section 2 and a waist section 2090.

The fused portion 2070 is then cleaved to produce end 10 (FIG. 19)). The cleave point could be located in the tapered portion of the bundle, 2, or the waist section, 2090. The cleaved end is then spliced to an output fibre 3 consisting of at least a core and a cladding (FIG. 20)). where the cladding might be a polymer cladding.

In addition to the embodiment described above, similar embodiments can be produced that incorporate additional features. It should be noted that the glass tube (2010) surrounding the bundle of fibres 2015 could act as a means of removing light present in the cladding of the input fibres (1001). If the light transmitted from the input fibres to the output fibre is considered as travelling in the forward direction (left to right in the figure), light transmitted from the output fibre to the input fibres can be referred to as backward light (right to left).

Figure 21:
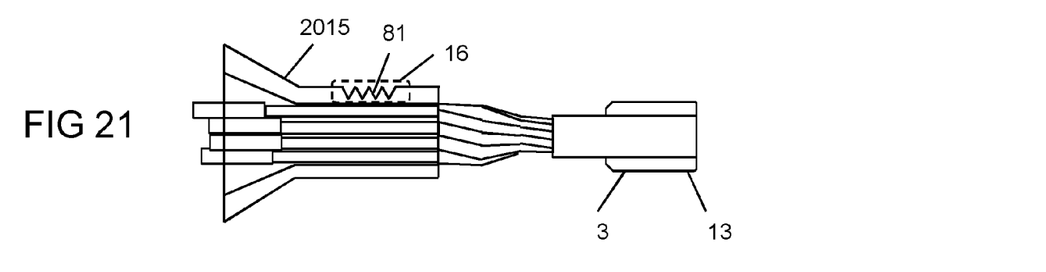
FIGS. 21 to 24 show examples of combiners with alternative cladding mode strippers.

FIG. 21 shows a method of removing this backward light by modifying the outer surface of the tube to produce a combiner mode stripper (CMS) 16, for example by using a $CO_2$ laser or other means to produce a series of notches or other thickness variations 81. Other methods of modifying the surface of the tube can also be envisaged, for example chemical etching or the use of a high refractive index material.

Figure 22:
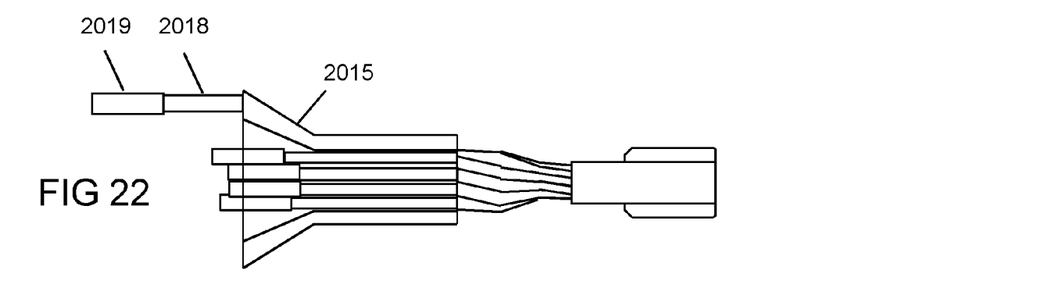

FIG. 22 shows the use of an additional optical fibre 2018, 2019 spliced to the cleaved end of the outer capillary. This fibre captures backward light transmitted through the structure. Since the capillary is no longer required to be of minimum thickness, this splice is straightforward to implement.

Figure 23:
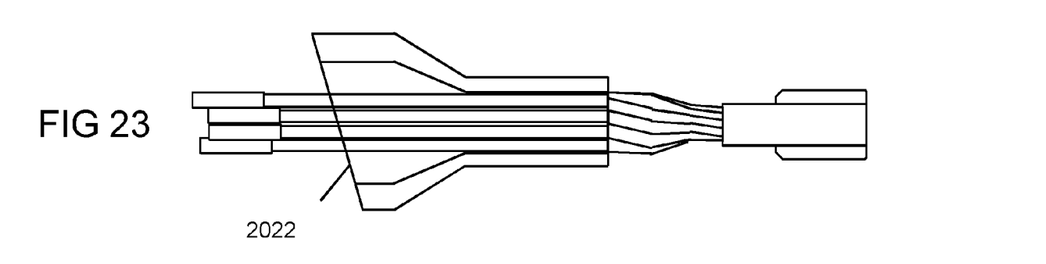

FIG. 23 shows another mechanism of accessing this backward light, using an outer capillary with an angled end 2022 that rejects backward light.

Since significant levels of light will only be present in the cladding of the input fibres when backward light is present then this method of cladding mode stripping offers a high degree of isolation between forward and backward light. The devices described in this application are often used for materials processing and can provide a method for real-time monitoring of these processes via the back-reflected signals generated by the process. One such example is pierce-detection, where a drop in back-reflected signal is used to indicate that a sample has been pierced by the incident laser light. Another example is where the magnitude of the back-reflected signal is monitored and a minimum in this signal is used to indicate that the material being processed is in the focal plane of the focusing optics. In both of these examples, the back-reflected light can be coupled from a cladding mode stripper to a detector. The signal to noise value of this signal will be improved if there is good isolation between the forward and backward laser power.

Figure 24:
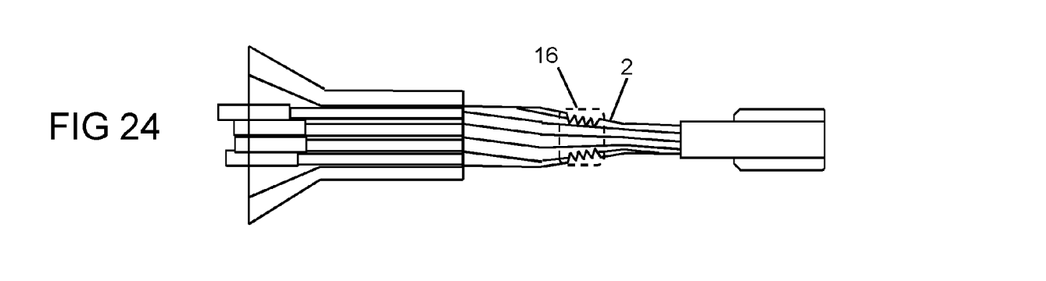

FIG. 24 shows a structure with a cladding mode stripper 16 that is incorporated into the tapered portion 2 of the fibre bundle and thus could act to preferentially remove cladding light, travelling either in the forward or backward direction. This cladding light could potentially damage polymer-coated fibres present on either side of the fibre bundle and so the robustness of the combiner is improved by providing such a cladding mode stripper.

In a non-limiting example of a 7:1 combiner (7 input fibres:one output fibre) the process is as follows:

An apparatus 100 mm length of highly fluorine-doped silica tube with inner diameter=1.23 mm, outer diameter=1.5 mm is tapered using a plasma-based arc. The arc produces a temperature sufficient to allow the silica tube to soften (approximately 1600-2000° C.). The tapering process produces a narrowed portion of tube ('waist') with approximate dimensions of inner diameter=385 μm, outer diameter=470 μm, length=40 mm.

A bundle of 7 fluorine-doped clad optical fibres (core diameter=109 μm, cladding diameter=125 μm) are prepared by removing approximately 80 mm of coating from one end of the fibres. The fibres are then loaded into the tube such that the bare ends of the fibre are located within the waist region of the tube.

The tube is then cleaved in the waist region to produce two sections of tube. The bare ends of the fibres are fused to the tube using the plasma arc which generates a temperature of approximately 1600-2000° C. sufficient to soften the tube and fibres and allow them to fuse together.

The two portions of tube can now be separated by moving one or both along the axis of the fibres. A gap of approximately 20 mm is introduced between the two sections and so a length of exposed fibres is created.

The plasma arc is now used to fuse the opposite end of the assembly so the tube and fibres are heated to 1600-2000° C., i.e. sufficient to soften the tube and fibres and allow them to fuse together.

The bundle of fibres can then be (optionally) either twisted (by rotating one or both of the portions of tube relative to the other) and/or fused (by translating the bundle through the plasma arc at a temperature of approximately 1600-2000° C.).

The exposed fibres are then tapered using the plasma arc (at a temperature of approximately 1600-2000° C.) to produce a waist diameter of approximately 240 micron and a waist length of 5 mm.

The tapered bundle of fibres is cleaved mechanically by applying a tension of approximately 400-500 g and scribing the bundle in the waist region using a diamond blade.

The cleaved bundle of fibres is then spliced to an output fibre, in this case a single-clad fibre with core diameter=250 μm. Standard, commercially-available splicers can be used to make this splice.

This process description is based around typical fibres and tubes. However other tubes and fibres could be used, the number of fibres could be altered, or other variations made. In particular, the number of input fibres can be between 3 and 76. Some typically used examples are 3, 4, 5, 7, 12, 19, 37 and 61 fibres although other numbers may be used. Other forms of bundle are also possible where, for example, the bundle consists of a mixture of fibres and one (or more) capillaries.

In a modification of the method the glass capillary extends across the whole of the tapered region (ie there is no exposed part), or may extend across a part of the tapered region.

The present invention extends to the above-mentioned features taken in isolation or in any combination.

It is to be appreciated that the embodiments of the invention described above with reference to the accompanying drawings have been given by way of example only and that modifications and additional components may be provided to enhance performance. Individual components shown in the drawings are not limited to use in their drawings and they may be used in other drawings and in all aspects of the invention.

The invention claimed is:

1. An apparatus for combining optical radiation, comprising a bundle of input optical fibres formed of glass, a taper, and an output optical fibre, wherein:
    the taper is fused to the output optical fibre; and
    the apparatus comprises at least one cladding mode stripper to strip out higher order modes that would otherwise degrade a polymer coating on at least one of the input optical fibres and the output optical fibre;
    wherein:
    the taper has a first end having a first diameter, and a second end having a second diameter;
    the first diameter is greater than the second diameter;
    the plurality of input optical fibres are coupled to the first end;
    the second end is coupled to the output optical fibre;
    the output optical fibre is defined by a fibre diameter $D_F$;
    the output optical fibre comprises a polymer coating;
    the output optical fibre is defined by a numerical aperture $NA_F$;
    the apparatus being characterized in that:
        the taper comprises the cladding mode stripper located at a diameter $D_{CMS}$ equal to a fraction, the numerator of which is the product of the fibre diameter $D_F$, the numerical aperture $NA_F$, and a factor $\beta$, and the denominator of which is the numerical aperture $NA_T$ of the waveguide formed by the taper, such that $D_{CMS}=D_F \cdot NA_F \cdot \beta / NA_T$;
        the factor $\beta$ is less than 1.0;
        thereby ensuring that higher angle rays propagating along the taper towards the output optical fibre are attenuated thus reducing or eliminating damage to the polymer coating.

2. An apparatus according to claim 1, wherein the taper comprises a glass outer cladding that comprises fluorosilicate.

3. An apparatus according to claim 1, wherein the output optical fibre has a numerical aperture $NA_F$ which is greater than or equal to 0.4.

4. An apparatus according to claim 1, wherein the taper comprises at least one optical fibre.

5. An apparatus according to claim 1, wherein the diameter $D_{CMS}$ is optimised to minimize heating of the polymer coating of the output optical fibre without substantially increasing the loss of the apparatus.

6. An apparatus according to claim 1, wherein the cladding mode stripper comprises variations in the thickness of the glass cladding.

7. An apparatus according to claim 1, wherein the factor $\beta$ is less than 0.95.

8. An apparatus according to claim 7, wherein the factor $\beta$ is less than 0.90.

9. An apparatus according to claim 1, wherein the cladding mode stripper comprises glass, a glass frit, silver solder, or another material other than a polymer, a fluid or a gel.

10. An apparatus according to claim 1, comprising a glass capillary that is fused to at least the outer fibres of the bundle of input optical fibres.

11. An apparatus according to claim 10, wherein the glass capillary has at least one angled end for reflecting higher order modes that may propagate along the capillary away from the glass capillary.

12. An apparatus according to claim 10, wherein the taper is formed by an exposed part of the input fibre bundle between the end of the capillary and the output fibre.

13. A method for combining optical radiation, the method comprising:
    providing a bundle comprising a plurality of input optical fibres, formed of glass and an output optical fibre;
    forming a taper;
    fusing the taper to the output optical fibre;
    making at least one cladding mode stripper to strip out higher order modes that would otherwise degrade a polymer coating on at least one of the input optical fibres and the output optical fibre, the method further comprising mounting the bundle between two spaced apart portions of capillary tube, with an exposed region of the fibre bundle between the two capillary tube portions;
    applying localised heat to the two portions of capillary tube to fuse the capillary tube, at the regions to which heat is applied, to at least the outer layer of the fibres in the bundle;
    tapering and fusing a part of the exposed region of fibres to produce a single bundle of fused fibres; and
    cleaving the fused bundle and splicing the cleaved bundle to the output fibre.

14. A method according to claim 13, further comprising twisting the exposed region of fibres.

15. A method according to claim 13, wherein the two capillary tube portions are formed from a single capillary, the method comprising loading the fibre bundle into a single capillary, applying localised heat to a region of the capillary to fuse the capillary tube to at least the outer layer of the fibres in the bundle at the region where heat is applied; cleaving the capillary tube at a point between the fused part and an end of the capillary to form two separate capillary tube portions;
    sliding the portion that is not fused to the input bundle in a direction away from the portion that is fused, to thereby expose a region of the fibre bundle;
    applying localised heat to a region of the capillary to fuse this, at the region where heat is applied, to at least the outer layer of the fibres in the bundle;
    fusing and tapering at least part of the exposed part of the fibres in the bundle to produce a single bundle of fused fibres;
    cleaving the fused bundle and splicing the cleaved bundle to the output fibre.

16. A method according to claim 13, further comprising modifying at least part of the outer surface of the capillary to vary the thickness of its wall.

17. A method according to claim 16, wherein the capillary has an end distal from the output fibre and the method further comprises splicing a further optical fibre to said rear end to act as a cladding mode stripper.

18. A method according to claim 17, wherein the capillary has an angled end, and the method further comprises angling the angled end at an angle other than 90° to the longitudinal direction of the fibre bundle.

19. A method according to claim 13, wherein the tapering further comprises tapering at least one optical fibre.

20. A method for combining optical radiation, the method comprising:
providing a bundle comprising a plurality of input optical fibres, formed of glass and an output optical fibre;
forming a taper;
fusing the taper to the output optical fibre; and
making at least one cladding mode stripper to strip out higher order modes that would otherwise degrade a polymer coating on at least one of the input optical fibres and the output optical fibre;
wherein the taper has a first end having a first diameter, and a second end having a second diameter;
the first diameter is greater than the second diameter;
the plurality of input optical fibres are coupled to the first end;
the second end is coupled to the output optical fibre;
the output optical fibre is defined by a fibre diameter Dp;
the output optical fibre comprises a polymer coating;
the output optical fibre is defined by a numerical aperture NAp;
wherein:
the taper comprises the cladding mode stripper located at a diameter $D_{CMS}$ equal to a fraction, the numerator of which is the product of the fibre diameter $D_F$, the numerical aperture $NA_F$, and a factor $\beta$, and the denominator of which is the numerical aperture $NA_T$, such that $D_{CMS} = D_F \cdot NA_F \cdot \beta / NA_T$;
the factor $\beta$ is less than 1.0;
thereby ensuring that higher angle rays propagating along the taper towards the output optical fibre are attenuated thus reducing or eliminating damage to the polymer coating.

21. A method according to claim 20, further comprising minimizing heating of the polymer coating of the output fibre without substantially increasing the loss of the apparatus by optimizing the diameter $D_{CMS}$.

22. A method according to claim 21, further comprising using glass or a glass frit, silver solder, or a material other than a polymer, a fluid, or a gel for the cladding mode stripper.

* * * * *